Oct. 11, 1927.
W. E. DEAN
1,644,669
CIRCUIT BREAKER DEVICE
Filed Dec. 21, 1926
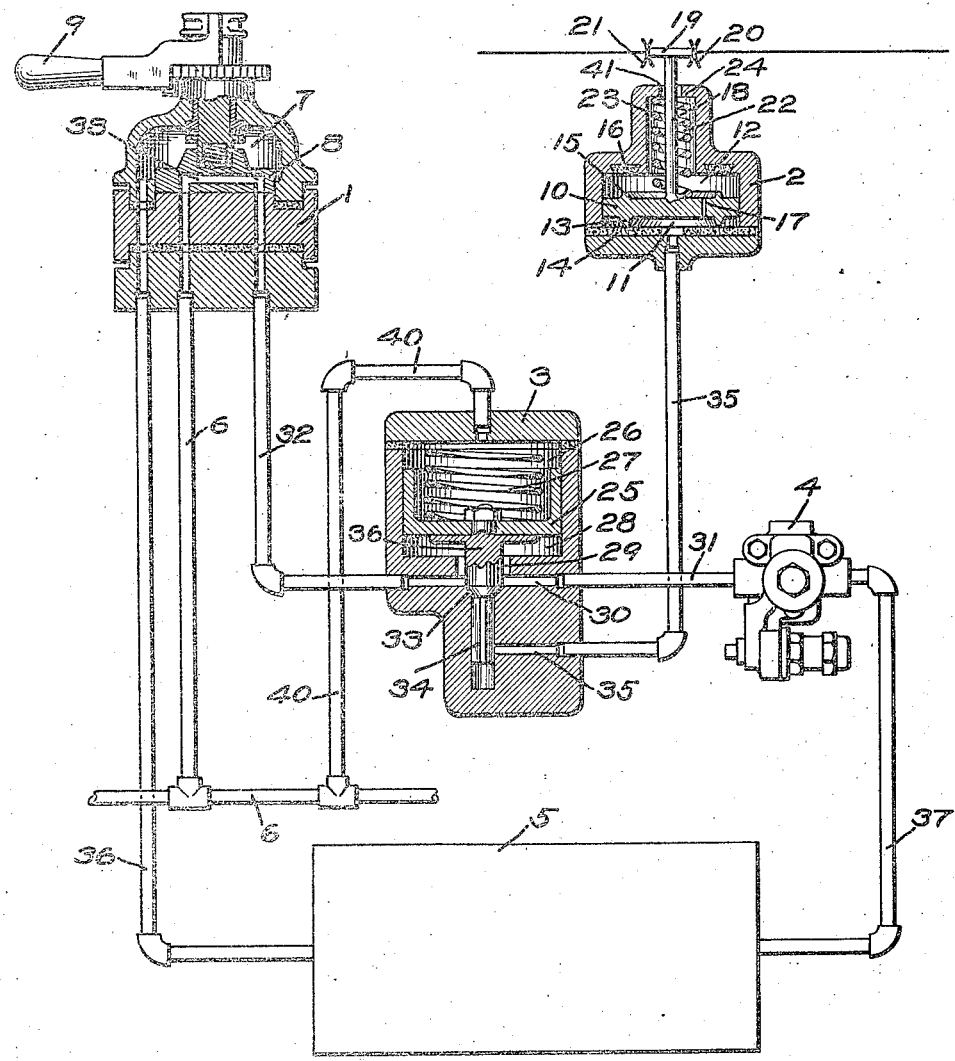
INVENTOR
WILLIAM E. DEAN
BY *Wm. M. Cady*
ATTORNEY Patented Oct. 11, 1927.

1,644,669

UNITED STATES PATENT OFFICE.

WILLIAM E. DEAN, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

CIRCUIT-BREAKER DEVICE.

Application filed December 21, 1926. Serial No. 156,140.

This invention relates to a device for opening the power circuit when the brakes are applied and is more particularly adapted for use on an electric locomotive.

It has heretofore been proposed to provide means on an electric locomotive for automatically opening the power circuit when the brake pipe pressure is reduced to effect an application of the brakes. With the prior devices of this character, the power circuit may be closed before the brake pipe has been adequately recharged and the brakes released, so that in starting, the brakes may still be applied, particularly at the rear end of the train.

The principal object of my invention is to provide means for opening the power circuit when the brakes are applied, in which the power circuit is held open until the brake system has been substantially recharged with fluid under pressure.

In the accompanying drawing, the single figure is a diagrammatic view, partly in section, of an apparatus for opening the power circuit when the brakes are applied, and embodying my invention.

According to the drawing, this brake equipment may comprise a brake valve device 1, a circuit breaker device 2, a circuit breaker control valve device 3, a feed valve device 4, a main reservoir 5, and a brake pipe 6.

The brake valve device 1 may comprise a casing having a chamber 7 containing a rotary valve 8, adapted to be operated by a handle 9.

The circuit breaker device 2 may comprise a casing, containing a piston 10, having a chamber 11 at one side and a chamber 12 at the opposite side and having a seat ring 13 on one side, adapted to seal against a gasket 14, and a seat ring 15 on the opposite side, adapted to seal against a seat 16, when the piston 10 is in the opposite position to that shown in the drawing. A small port 17 through the piston 10 connects chambers 11 and 12.

Secured to the piston 10 is a piston rod 18 having a switch member 19 at its outer end, said switch member being adapted to be operated by the piston 10 to open or close the motor circuit through contacts 20 and 21. The piston rod 18 extends through a chamber 22 containing a coil spring 23 interposed between the casing wall 24 and the piston 10.

The control valve device 3 may comprise a casing containing a piston 25, having a chamber 26 at one side, containing a coil spring 27 acting on said piston, and having a chamber 28 at the opposite side connected through an opening 29 to a passage 30 interposed in the usual feed valve pipe 31—32.

Secured to the control piston 25 by a stem 36 is a valve 33 having a fluted stem 34, adapted to guide said valve in the casing 3, and when said valve is open, the fluted stem 34 permits communication between passage 30 and passage and pipe 35. The stem 36 connecting the valve 33 to the piston 25 extends through the opening 29, of larger diameter than the stem, so as to permit free communication between chamber 28 and passage 30.

In operation, fluid under pressure from the main reservoir 5 is supplied through pipe 36 to chamber 7 of the brake valve device 1, and through pipe 37 to the usual feed valve device 4, which feed valve device supplies fluid at the standard pressure to be carried in the brake pipe, to pipe 31 and thence through passage 30 and pipe 32 to the seat of the rotary valve 8 of the brake valve device.

With the rotary valve 8 in running position, as shown in the drawing, fluid under pressure is supplied to the brake pipe 6, through cavity 38 in the rotary valve.

The brake pipe having been charged by flow from the feed valve device to the standard pressure for which the feed valve device is adjusted, the pressure of fluid supplied from the brake pipe 6 through pipe 40 to chamber 26 of the control valve device, will be the same as the pressure of fluid supplied from the feed valve device 4 through passage 30 to chamber 28, so that fluid pressures on opposite sides of piston 25 are equal and the spring 27 operates on piston 25 to hold the valve 33 seated.

If the brake pipe pressure be reduced, as by a train break-in-two, or by reason of a ruptured hose, the pressure in chamber 26 will likewise be reduced, and more rapidly than the pressure in pipe 32 is reduced by flow through the cavity 38 to the brake pipe. The higher pressure in chamber 28 then operates the piston 25 to open the valve 33, so as to permit fluid under pressure to be supplied from passage 30 to pipe 35 which leads to piston chamber 11 of the power switch device 2. The switch piston 10 is then shifted so as to move the switch member 19 out of engagement with the contacts 20 and 21, thus opening the power circuit.

When the brakes are being released, the piston 25 will be maintained in the position with the valve 33 held unseated, since the pressure of fluid flowing from the feed valve device through passage 30 will be somewhat higher than the pressure in the brake pipe by reason of the fact that fluid under pressure from the feed valve device must flow through cavity 38 in the rotary valve to the brake pipe 6, and since the cavity acts to restrict the flow.

The switch piston 10 is therefore held in its position with the power circuit opened, so long as the valve 33 is held unseated and the piston 25 will hold the valve 33 unseated until the brake pipe pressure has been increased to substantially the full standard pressure carried. When the brake pipe pressure has been increased to substantially the standard pressure, the fluid pressures on opposite sides of the piston 25 become equal, permitting the spring 27 to operate the piston 25 so as to seat the valve 33. The fluid under pressure in pipe 35 and chamber 11 then escapes to the atmosphere through port 17 in piston 10, permitting the spring 23 to shift the piston 10 so that the switch member 19 again closes the power circuit through the contacts 20 and 21.

It will thus be seen that I have provided means for causing the power circuit to be opened when the brake pipe pressure is reduced to effect an application of the brakes and in which the power circuit will not be closed until the brake pipe pressure has been restored to substantially the standard pressure carried in the system.

Having now described my invention, what I claim as new and desire to secure by Letters Patent, is:—

1. The combination with the brake pipe of a fluid pressure brake system and a switch device for controlling the power circuit of an electrically propelled vehicle, of means operated upon a reduction in brake pipe pressure to apply the brakes for operating said switch device to open the power circuit and means for preventing the operation of said switch device to close the power circuit until the brake pipe has been substantially fully recharged with fluid under pressure.

2. The combination with the brake pipe of a fluid pressure brake system and a switch device for controlling a power circuit, of a controlling valve device, subject to the opposing pressures of the brake pipe and the flow of fluid to recharge the brake pipe, and operated upon a reduction in brake pipe pressure for operating said switch device to open the power circuit.

3. The combination with the brake pipe of a fluid pressure brake system and a switch device for controlling a power circuit, of a feed valve device for supplying fluid under pressure to the brake pipe and a controlling valve device subject to the opposing pressures of the brake pipe and the pressure of fluid supplied from the feed valve device to the brake pipe and operated upon a reduction in brake pipe pressure for operating said switch device to open the power circuit.

4. The combination with the brake pipe of a fluid pressure brake system and a switch device operated by fluid under pressure for opening a power circuit, of a feed valve device for supplying fluid under pressure to the brake pipe, a piston subject to the opposing pressures of the brake pipe and the pressure of fluid supplied from the feed valve device to the brake pipe, and a valve operated by said piston for controlling the supply of fluid under pressure to said switch device.

5. The combination with the brake pipe of a fluid pressure brake system and a switch device operated by fluid under pressure for controlling a power circuit, of a feed valve device, a brake valve device for controlling the supply of fluid from the feed valve device to the brake pipe, a piston subject to the opposing pressures of the brake pipe and the pressure of fluid flowing from the feed valve device to the brake pipe, and a valve operated by said piston for controlling the fluid pressure on said switch device.

In testimony whereof I have hereunto set my hand.

WILLIAM E. DEAN.